(12) United States Patent
Mee

(10) Patent No.: US 7,028,485 B1
(45) Date of Patent: Apr. 18, 2006

(54) SURGE PREVENTION FOR COMPRESSOR INLET AIR FOGGING

(75) Inventor: Thomas R. Mee, Monrovia, CA (US)

(73) Assignee: Mee Industries, Inc., Monrovia, CA (US)

( * ) Notice: Subject to any disclaimer, the term of this patent is extended or adjusted under 35 U.S.C. 154(b) by 196 days.

(21) Appl. No.: 10/678,420

(22) Filed: Oct. 2, 2003

Related U.S. Application Data

(60) Provisional application No. 60/415,472, filed on Oct. 2, 2002.

(51) Int. Cl.
*F02C 3/30* (2006.01)
*F04D 27/02* (2006.01)

(52) U.S. Cl. .................. 60/775; 60/39.53; 415/116

(58) Field of Classification Search .............. 60/39.3, 60/39.48, 39.53, 39.58, 39.59, 775; 137/225; 222/215, 394, 399; 415/116
See application file for complete search history.

(56) References Cited

U.S. PATENT DOCUMENTS

| 3,100,964 | A | * | 8/1963 | Bevers et al. | 60/39.3 |
| 5,353,585 | A | * | 10/1994 | Munk | 60/775 |
| 6,484,507 | B1 | * | 11/2002 | Pradt | 60/775 |
| 6,516,603 | B1 | * | 2/2003 | Urbach et al. | 60/39.3 |
| 6,609,360 | B1 | * | 8/2003 | Utamura | 60/39.53 |

* cited by examiner

*Primary Examiner*—Louis J. Casaregola
(74) *Attorney, Agent, or Firm*—Christie, Parker & Hale, LLP

(57) ABSTRACT

A gas turbine or the like with an axial flow inlet compressor has a fogging system for introducing water droplets into the air inlet to the compressor. A compressor may exhibit a "surge" in the event air temperature drops rapidly, which may occur in the event introduction of fogging water droplets is essentially instantly discontinued. One or more pressure accumulators are connected to the water supply of the fog generating system so that in the event there is an interruption in the water supply the accumulator can provide a gradually decreasing water flow to the fog generator. The accumulator gradually decreases water flow for at least about one second. In a fog system having a plurality of fog generating manifolds, separate accumulators may be connected to each manifold.

35 Claims, 3 Drawing Sheets

SURGE PREVENTION FOR COMPRESSOR INLET AIR FOGGING

CROSS-REFERENCE TO RELATED APPLICATION(S)

This application claims benefit of the filing date of U.S. Provisional Patent Application No. 60/415,472, filed Oct. 2, 2002.

FIELD OF THE INVENTION

The subject matter of the provisional application is hereby incorporated by reference.

This invention relates to operation of gas turbines and the like with an axial flow compressor, and means for introducing water droplets into an air duct to the compressor. The invention provides means for preventing surging in such a turbine.

BACKGROUND

Gas turbines employ multi-stage axial flow compressors, which comprise as many as seventeen banks of rotating fan blades, with each circumferential row of blades followed by a row of fixed blades called stators. The compressor shaft is connected to a gas-expansion turbine such that rotation of the expansion turbine shaft causes the compressor shaft to rotate. Rotation of the compressor shaft causes the first stage blading to suction air through the compressor inlet. The air is compressed as it passes the first stage of non-rotating blades, then flows to the next stage of rotating blades where the compression process is repeated. The result at the end of all the stages of compression is air that has been compressed to about ten times higher than ambient pressure.

Axial flow compressors must be carefully controlled to avoid surge. Surge results when the pressure in the later stages of compression becomes too high. This results in a sudden reversal in the direction of air flow through the turbine which can lead to catastrophic failure of the compressor, such as blade breakage, or damage to the inlet filter and housing, or both. A full blown surge may result in hot combustion gases flowing backwards from the combustor and out the inlet of the compressor, which hot gases can also cause considerable damage to the gas turbine and associated parts.

The shaft power output of a turbine is proportional to the mass flow of air through the expansion turbine. Increasing mass flow results in more power output. But, the compressor is a constant volume machine. For a given rotational speed, the compressor has what is often referred to as a constant swallowing rate. In other words, the mass flow is determined by the geometry of the first stage blades; with each revolution they "slice off" a fixed volume of air, and that is the only mass of air introduced to the turbine.

Inlet fogging is used to increase the output of gas turbines by evaporative cooling the inlet air stream. When the air is cooler and denser the turbine makes more power than when it is hot and dry. Thus, inlet air fogging increases the amount of power produced by the turbine. Inlet fogging can cool the air stream only to the ambient wet bulb (i.e. when 100% humidity is reached, any remaining droplets will fail to evaporate).

It can also be desirable to add more water droplets in the fog than will evaporate before reaching the compressor. Since the compression process heats the air, any liquid droplets that are carried into the compressor by the air stream, will evaporate in the early stages of the compressor. This increases mass flow (since the liquid water droplet has more density than the air it displaces) and reduces the work consumed by the compressor by further cooling the air, which makes it more dense. This "intercooling" effect is variously referred to as wet compression or fog intercooling or simply overspray or overfogging.

There is a risk inherent to inlet fogging (with or without overspray) which has not, so far, been adequately addressed and mitigated by manufacturers of inlet fogging systems. If the fog is suddenly stopped, the compressor will suddenly see hotter, less dense air and the first stages of compression will undergo a significant reduction in pressure. Compressor surge may result and, in fact, has resulted in at least one case.

Fog systems are typically deployed in stages with each stage providing several degrees of cooling (or the equivalent when used for overspray.) These stages can, and often are, removed over time to reduce the possibility of compressor surge. Alternatively, fog systems are controlled by varying the pressure of the feed water, so that more or less water flows from the same number of fog nozzles.

But what about the event of sudden loss of fogging due to failure of the high pressure pumps or sudden lack of water supply? This invention provides a nearly fail-safe technique for avoiding compressor surge, which could result from the sudden loss of fogging.

BRIEF SUMMARY OF THE INVENTION

There is provided in practice of this invention a turbine with an inlet compressor and a fogging system for introducing water droplets into the inlet air to the compressor. A reservoir of water is connected to the fogging system for temporarily supplying sufficient water to the system, in the event of shutdown of water supply, with gradually decreasing flow for a sufficient time to avoid surge.

DRAWINGS

DESCRIPTION

Figure 1:
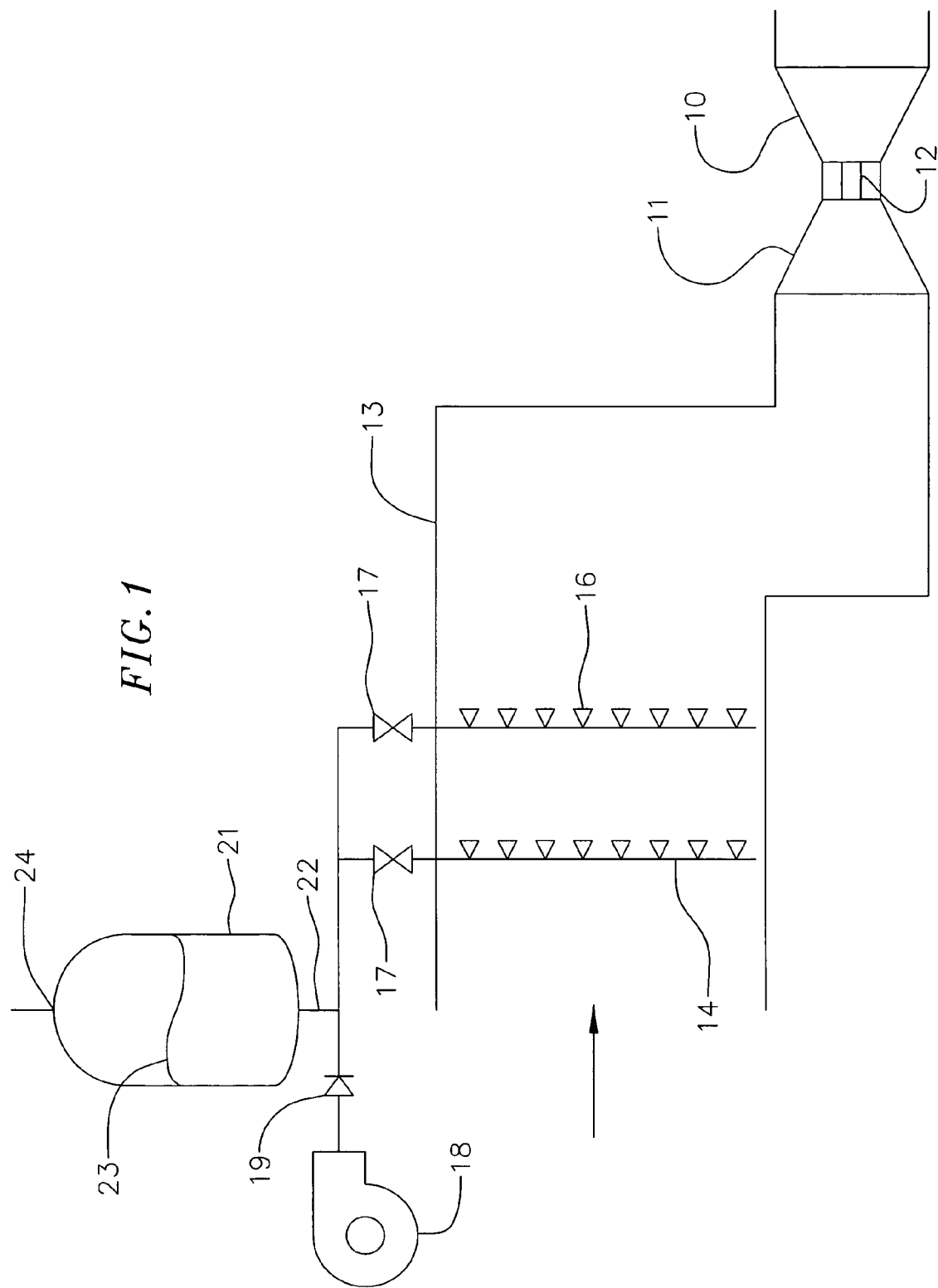
FIG. 1 illustrates schematically a turbine system with fogging and a hydraulic accumulator for preventing surge.

A typical gas turbine installation has an axial flow expansion turbine section 10 and an axial flow compressor section 11. A shaft from the turbine drives the compressor via a shaft 12. An air inlet duct 13 introduces combustion air to the compressor inlet. In some gas turbine installations there is a fog generation system for introducing water droplets into the air inlet duct for evaporative cooling of inlet air and in some cases overspray where water droplets enter the compressor and evaporate in the compressor.

A typical fog generation system comprises pipe manifolds 14 with a number of fog generating nozzles 16 which introduce water droplets into the air flowing through the inlet duct. Control valves 17 are connected to the manifolds so that one, two or more manifolds of nozzles may be activated to provide a desired amount of fog in the inlet duct.

In the schematic illustration two such manifolds are illustrated, however, it will be recognized that a typical installation may employ a dozen or more manifolds to provide an adequate amount of fog distributed across the inlet duct. It will also be recognized that there are other structures not illustrated, such as air filters upstream from the nozzles and sometimes where overspray is not desired there are downstream baffles to remove excess and oversize droplets from the air stream.

Water is supplied to the manifolds under high pressure (e.g. 500 to 3000 psi) by a pump 18. Often where there are numerous manifolds more than one pump is used in parallel so that one pump may be used at times and other pumps added as demand for fog increases. In the illustrated embodiment there is a check valve 19 in the water line from the pump(s) to prevent backflow. This is optional since backflow does not occur when positive displacement piston pumps are employed. This much of the gas turbine installation is conventional.

In practice of this invention, a hydraulic accumulator 21 is connected to the water supply pipe between the pump and manifolds. A hydraulic accumulator is a pressure vessel which contains a single inlet-outlet port 22 and which is fitted with a bladder 23 constructed of rubber (or other suitable elastomeric material). The bladder isolated volume is filled, through a different port 24, with compressed gas (ambient air or, often, nitrogen or other inert gas so as to maintain the mechanical integrity of the rubber bladder). A typical accumulator is connected to a pressurized water pipe (in this case, the pump outlet), such that the inlet-outlet port forms a flow passage from the water pipe to the inside of the pressure vessel. When water is added to the pipe, it flows into the inlet of the pressure vessel and compresses the gas on the other side of the bladder. When pressure is removed from the line, water flows out of the pressure vessel, because of the pressure exerted by the gas filled bladder.

Other types and designs of accumulators exist or could be made. These could include pistons or diaphragms used in place of a gas filled bladder. Mechanical springs may be used instead of pneumatic springs.

Most fog systems currently employ small accumulators, often called pulsation dampeners, for the purpose of removing pressure spikes that cause excessive vibration of the pump discharge line but these do not have enough volume of water to accomplish a gradual reduction over time of inlet fogging water flow sufficient to avoid compressor surge. The water volume in such pulsation, dampeners is kept small so there is low inertia and fast response. A typical pulsation dampener in a fog generating system has a water volume of only about one to two cubic inches (15–35 ml.)

Thus, in the new system, an anti-surge pressure accumulator 21 is installed on the downstream side of the inlet fogging system high-pressure pump(s). In the event of pump failure or other shutdown of water supply, whether intentional or unintentional, the air pressure against the reservoir of water contained in the anti-surge accumulator will cause water to flow out of the turbine inlet fogging nozzles into the inlet air duct When a pump is first stopped, the pressure in the accumulator will be very near the pump's operating pressure, but it will gradually fall as time passes and the pressurized bladder reaches it fully extended position. This gradual reduction of fog water flow effectively eliminates the chance of compressor surge due to sudden removal of inlet fogging and the attendant increase in inlet air temperature and decrease in inlet air density.

The anti-surge accumulator has sufficient water and pressure to reduce water flow, through the inlet nozzles to near zero over a sufficient time to prevent turbine surge. Typically, about one second of gradual reduction of flow is sufficient. Air moves from the first stage of compression to the last stage of compression in a gas turbine compressor in a fraction of a second. Thus, the amount of water injected by the accumulator need only be enough to allow for a gradual decrease in fog injection rate from 100% to near zero in at least about one second.

Actually, the accumulator may not (and probably should not) supply water in a continuously varying rate from maximum flow all the way to zero; there may be a discontinuity when the diaphragm in the accumulator reaches the outlet and flow stops almost instantly. There would be a gradual decrease in flow to that point. A compressor can tolerate some rapid decrease of air temperature without surge. Different turbines have different sensitivities. Some may not surge even if air temperature changes 10° F., whereas a very sensitive turbine may be at risk with an air temperature decrease as little as 5° F. All the accumulator for such a turbine system needs to do is lower the water-flow enough that any "step" at the end is less than the sensitivity of the turbine. Such a step is actually desirable in some installations since water droplet size increases as the water pressure decreases. Large droplets tend to be undesirable, so stopping flow before droplets become too large may be preferred.

Choosing the size of accumulator is simple. Assume that the desired maximum water flow to the nozzles and into the air inlet duct is 60 gallons per minute. To gradually reduce the flow from maximum to near zero in one second only requires that the water volume contained in the accumulator is a maximum of one gallon. Actually, less water is needed since one needs to consider only an average flow during the time the water discharges from the accumulator. Having an excess of water in the accumulator is not a problem since that simply extends the time of gradual flow reduction. The time interval would naturally be longer when the flow to less than all of the manifolds is less than the maximum fog system capability.

The rate of discharge of water from the accumulator is also partially dependent on the original charging pressure of gas in the accumulator. (An accumulator may have an initial gas pressure of 200 to 750 psi, for example). When the pump is running, the gas pressure is at the system pressure and initial flow is a function of that pressure. Flow nearer the end, however, is partly a function of charging pressure. Thus, it may be desirable to employ more than one accumulator in parallel, each with a different charging pressure to modulate flow from the collective set of accumulators. Throttling orifices may also be used to limit flow rate from one or more accumulators. A mix of such techniques may readily be used to tailor the flow curve and end point to a specific compressor installation.

Although a gas charged accumulator is easily and reliably used, a spring loaded pressure vessel may be used instead to provide a short-time gradually diminishing flow of water to the nozzles. This refers to a mechanical spring, since the gas in the accumulator is a type of elastic spring. Other means may be used to provide a temporary supply of water decreasing gradually from high to low pressure (or flow rate) for a sufficient time to prevent turbine surge. Other equivalents will be apparent.

Figure 2:
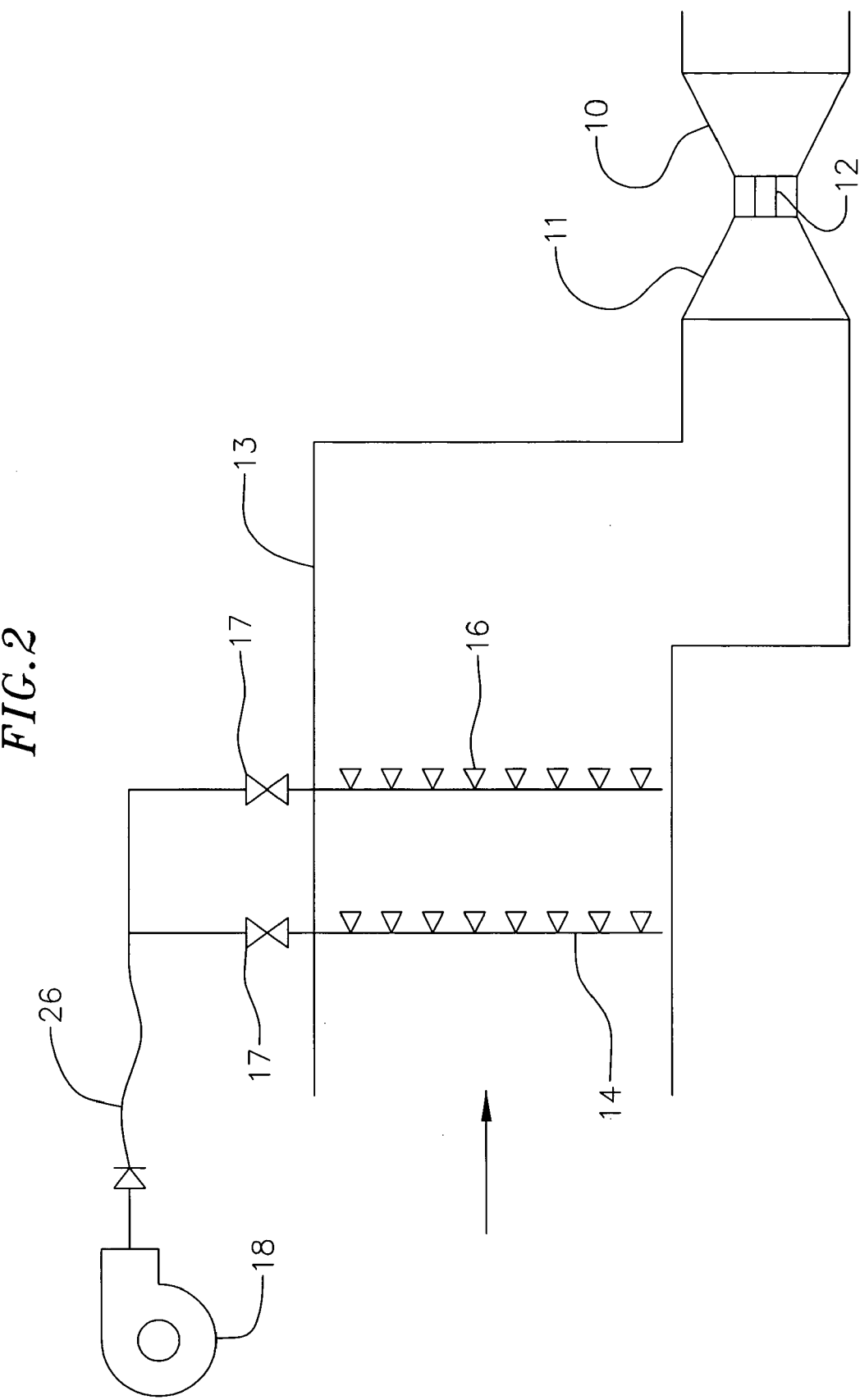
FIG. 2 illustrates, schematically a turbine system with fogging and a flexible, expandable hose for preventing surge.

For example, an alternative to avoid compressor surge that can be caused by the sudden removal of fog is to use a suitable length of high-pressure flexible hose to connect the fog system high-pressure pumps to the nozzle manifolds in the inlet air duct. Such a system is illustrated in FIG. 2, which is identical to FIG. 1 except that a flexible conduit 26 connects the high pressure pump(s) 18 to the nozzle manifolds. High-pressure hose expands elastically when pressurized and contracts when pressure is removed. Thus, an elastic conduit or reservoir provides the same function as a high pressure accumulator. If the direct line from the pumps to the manifolds does not have enough volume change upon pressurizing, another length of hose may be added at a T to provide additional volume, or one could also employ an accumulator with somewhat less volume than appropriate for rigid piping.

Figure 3:
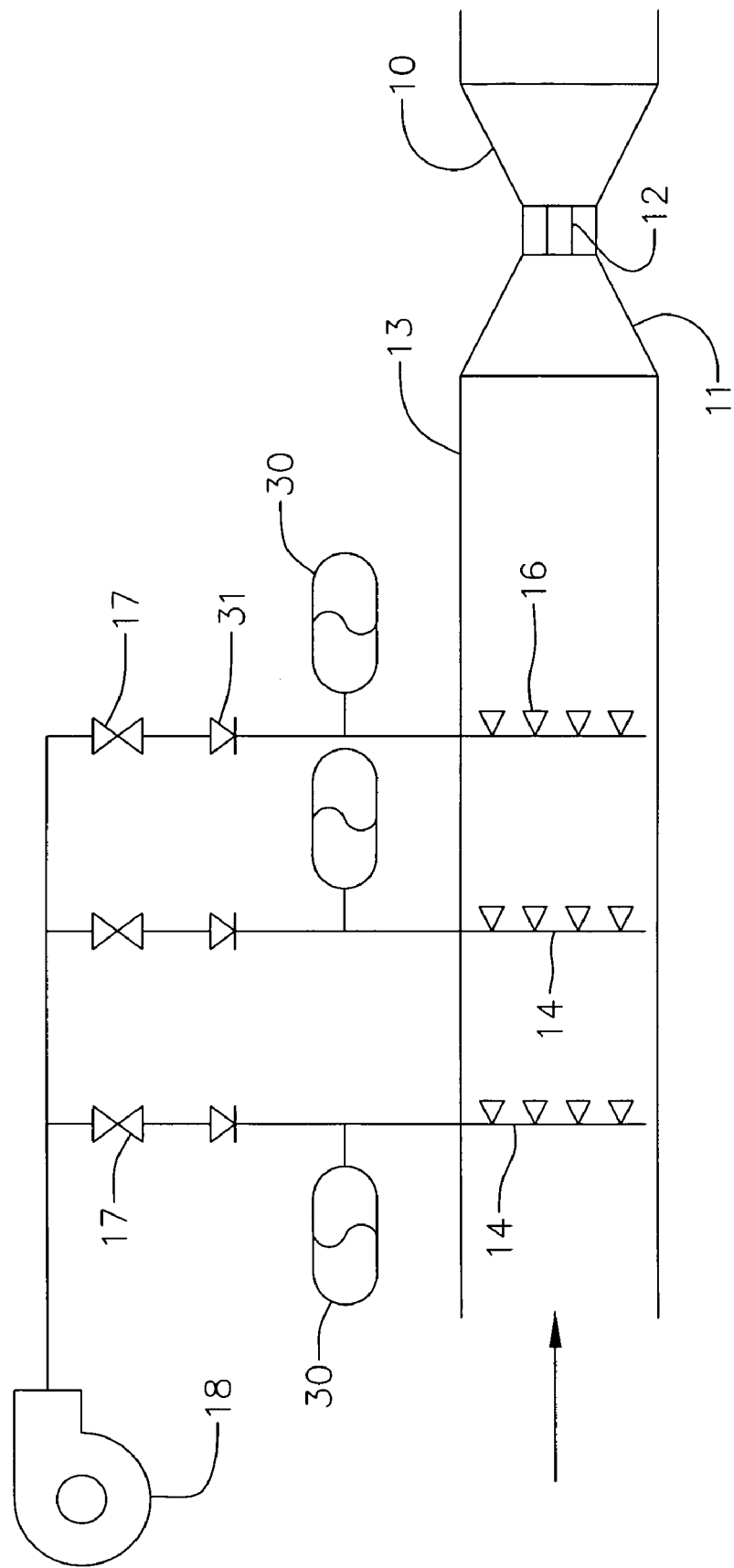
FIG. 3 illustrates schematically a turbine system with fogging via a number of manifolds and an accumulator connected to each manifold.

A somewhat different and possibly better arrangement for avoiding surge in an axial flow compressor is illustrated in FIG. 3. In this embodiment fog droplets are introduced into the air flow through an inlet duct 13 to an axial flow compressor. A number of manifolds 14 are used for introducing fog and each manifold is controlled by a valve 17 so that as few or as many manifolds as desired may be used. An accumulator 30 as described above is connected to each manifold. Each manifold is also isolated from the water supply system by a check valve 31 upstream from the respective accumulator. With such an arrangement, in the event the water supply is interrupted the accumulator attached to each of the manifolds supplies water to the respective manifold for a sufficient time to avoid surge in the compressor. Use of multiple accumulators is desirable not only because they are closer to the manifolds but also because a plurality of small accumulators may be less costly than a single large accumulator capable of supplying water to all of the manifolds. In a typical fog generating system the operating pressure may be close to 2,000 psi and large accumulators for such high pressure service can be quite expensive.

Gas turbine manufacturers can provide information on specific compressors, such as compressor maps which show the surge line for the compressor, which will allow one of ordinary skill to design a suitable inlet fogging anti-surge system as described above. One need only determine the sensitivity of the given compressor to surge that would be caused by sudden increases in inlet air temperature in order to design, a suitable anti-surge system. But for most compressors a gradual reduction in fogging over a period of one to two seconds should be adequate to avoid surge. Knowing the flow rate of water through the nozzles enables one to find the appropriate size of anti-surge accumulator or equivalent to provide sufficient water for gradual reduction.

The device described above can be applied to any axial flow compressor, whether connected as part of a gas turbine or used separately for some other gas compression process. For example, inlet fogging has been used into air compressors which are used for harvesting nitrogen, oxygen, argon, etc. from ambient air. An anti-surge accumulator or the like may be used on such systems, too.

What is claimed is:

1. An anti-surge device comprising:

an axial flow compressor;

means for introducing water droplets into an inlet duct to the compressor comprising a plurality of nozzles, a pump supplying high pressure water to the nozzles, and conduit connecting the pump and nozzles; and elastic means for temporarily supplying sufficient water, in the event of shutdown of pumped water supply, to the nozzles with gradually decreasing flow for a sufficient time to avoid surge.

2. An anti-surge device according to claim 1 wherein the elastic means comprises an accumulator connected to the conduit.

3. An anti-surge device according to claim 1 wherein the elastic means comprises an elastically flexible portion of the conduit.

4. An anti-surge device according to claim 1 wherein the elastic means comprises a spring loaded reservoir of water.

5. An anti-surge device according to claim 1 wherein the elastic means supplies water for at least one second after shutdown of water supply.

6. An anti-surge device according to claim 1 wherein the elastic means comprises a plurality of accumulators.

7. An anti-surge device according to claim 1 wherein the elastic means comprises an accumulator connected to each of a plurality of nozzle manifolds for introducing water droplets into inlet air to the compressor.

8. An anti-surge device comprising:

an axial flow compressor;

a fog generator for introducing water droplets into an inlet duct to the compressor;

a reservoir containing sufficient water to gradually decrease flow, in the event of shutdown of a primary water supply to the fog generator, for a sufficient time to avoid surge; and means for supplying water from the reservoir to the fog generator in the event of shutdown of primary water supply.

9. An anti-surge device according to claim 8 wherein the reservoir contains sufficient water to supply water to the fog generator for at least one second after shutdown of water supply.

10. An anti-surge device according to claim 8 wherein the reservoir comprises an accumulator.

11. An anti-surge device according to claim 10 wherein the reservoir comprises an elastically flexible conduit connected to the fog generator.

12. An anti-surge device according to claim 10 wherein the reservoir is activated by gas pressure to supply water to the fog generator.

13. An anti-surge device according to claim 8 wherein there are a plurality of fog generating manifolds and a reservoir is connected to each of the manifolds.

14. An anti-surge device according to claim 13 wherein each of the reservoirs comprises an accumulator.

15. An anti-surge device according to claim 8 wherein the reservoir comprises a plurality of accumulators.

16. An anti-surge device comprising:

an axial flow compressor;

means for introducing water droplets into an inlet duct to the compressor comprising a plurality of nozzle manifolds, and a pump supplying high pressure water to the manifolds; and an elastic water supply connected to each manifold.

17. An anti-surge device according to claim 16 wherein each of the water supplies comprises an accumulator.

18. An anti-surge device according to claim 16 wherein the water supplies collectively contain sufficient water, in the event of shutdown of water supply, to gradually decrease flow of water for a sufficient time to avoid surge.

19. A method for preventing surge in an axial flow compressor comprising:

introducing water droplets to an air inlet duct to the compressor through a fog generator;

storing water under pressure in a reservoir connected to the fog generator; and releasing water from the reservoir through the fog generator for a sufficient time to prevent surge of the compressor in the event other water supply to the nozzles is interrupted.

20. A method according to claim 19 wherein the water is released gradually over an interval of at least about one second.

21. A method according to claim 19 wherein the reservoir comprises a plurality of accumulators.

22. A method according to claim 21 wherein each accumulator has a different charging pressure.

23. A method according to claim 21 wherein water droplets are introduced via a plurality of nozzle manifolds and the reservoir comprises a plurality of accumulators, each accumulator being connected to a respective manifold.

24. A method for preventing surge in an axial flow compressor comprising:
   introducing water droplets to an air inlet duct to the compressor through a fog generator connected to a primary water supply;
   storing water under pressure in a reservoir connected to the fog generator; and
   releasing water from the reservoir through the fog generator gradually over an interval of at least about one second in the event of interruption of the primary water supply.

25. A method according to claim 24 wherein the reservoir comprises a plurality of accumulators.

26. A method according to claim 25 wherein each accumulator has a different charging pressure.

27. A method according to claim 24 wherein water droplets are introduced via a plurality of nozzle manifolds and the reservoir comprises a plurality of accumulators, each accumulator being connected to a respective manifold.

28. A method for preventing surge in a gas turbine system including an axial flow compressor comprising:
   introducing water droplets to the compressor;
   storing water under pressure in a reservoir;
   releasing water from the reservoir in the form of droplets into the compressor in the event other water supply to the nozzles is interrupted; and
   gradually reducing flow of water droplets from the reservoir into the compressor.

29. A method according to claim 28 wherein the reservoir comprises a plurality of accumulators.

30. A method according to claim 29 wherein each accumulator has a different charging pressure.

31. A method according to claim 28 wherein water droplets are introduced via a plurality of nozzle manifolds and the reservoir comprises a plurality of accumulators, each accumulator being connected to a respective manifold.

32. A method for preventing surge in a gas turbine system including an axial flow compressor comprising:
   introducing water droplets to the compressor;
   storing water under pressure in a reservoir; and
   gradually releasing sufficient water from the reservoir in the form of droplets to the compressor to prevent surge of the turbine in the event other water supply to the nozzles is interrupted.

33. A method according to claim 32 wherein the reservoir comprises a plurality of accumulators.

34. A method according to claim 33 wherein each accumulator has a different charging pressure.

35. A method according to claim 32 wherein water droplets are introduced via a plurality of nozzle manifolds and the reservoir comprises a plurality of accumulators, each accumulator being connected to a respective manifold.

* * * * *